US012810640B2

(12) United States Patent
Boiarov et al.

(10) Patent No.: US 12,810,640 B2
(45) Date of Patent: Nov. 24, 2026

(54) SYSTEM AND METHOD FOR INTELLIGENCE-BASED RACING PHOTO ANALYSIS

(71) Applicants: Constructor Technology AG, Schaffhausen (CH); Constructor Education and Research Genossenschaft, Schaffhausen (CH)

(72) Inventors: Andrei Boiarov, Sofia (BG); Dmitrii Bleklov, Sofia (BG); Pavlo Bredikhin, Kharkov (UA); Nikita Koritskii, Berlin (DE); Sergey Ulasen, Singapore (SG); Serg Bell, Costa del Sol (SG); Stanislav Protasov, Singapore (SG); Laurent Dedenis, Singapore (SG); Nikolay Dobrovolskiy, Istambul (TR)

(73) Assignees: Constructor Technology AG, Schaffhausen (CH); Constructor Education and Research Genossenschaft, Schaffhausen (CH)

( * ) Notice: Subject to any disclaimer, the term of this patent is extended or adjusted under 35 U.S.C. 154(b) by 253 days.

(21) Appl. No.: 18/667,121

(22) Filed: May 17, 2024

(65) Prior Publication Data

US 2025/0356674 A1 Nov. 20, 2025

(51) Int. Cl.

| | |
|---|---|
| ***G06V 30/10*** | (2022.01) |
| ***G06T 7/90*** | (2017.01) |
| ***G06V 10/762*** | (2022.01) |
| ***G06V 10/764*** | (2022.01) |
| ***G06V 20/70*** | (2022.01) |

(52) U.S. Cl.

CPC ................ *G06V 30/10* (2022.01); *G06T 7/90* (2017.01); *G06V 10/762* (2022.01); *G06V 10/764* (2022.01); *G06V 20/70* (2022.01); *G06T 2207/20081* (2013.01); *G06T 2207/20132* (2013.01); *G06V 2201/07* (2022.01)

(58) Field of Classification Search

None

See application file for complete search history.

(56) References Cited

U.S. PATENT DOCUMENTS

| | | | | |
|---|---|---|---|---|
| 7,991,715 | B2 * | 8/2011 | Schiff | G06Q 30/0273 706/45 |
| 8,447,112 | B2 * | 5/2013 | Paul | G06V 20/625 382/105 |
| 10,657,809 | B2 * | 5/2020 | Schumacher | G06V 20/54 |

(Continued)

FOREIGN PATENT DOCUMENTS

| | | |
|---|---|---|
| CN | 106897770 | 6/2017 |
| KR | 101851492 | 4/2018 |

*Primary Examiner* — Anand P Bhatnagar

(74) *Attorney, Agent, or Firm* — ESPE Legal Consultancy FZ-LLC

(57) ABSTRACT

Systems and methods for analyzing images include an application that uses deep learning and computer vision models. Automatic analysis of photographic images allows, for example, for the identification of important elements in these images. For example, the application detects racing vehicles, vehicle numbers, vehicle details, and the orientation of these vehicles. These vehicles, typically cars, have specific attributes associated with a racing environment that can be detected with an application that comprises customized modules adapted to specific detection tasks.

16 Claims, 6 Drawing Sheets

(56) References Cited

U.S. PATENT DOCUMENTS

| | | | | |
|---|---|---|---|---|
| 10,963,721 | B2 * | 3/2021 | Georgis | G06F 18/214 |
| 11,417,125 | B2 * | 8/2022 | Georgis | G06V 30/413 |
| 12,223,705 | B2 * | 2/2025 | Zhang | G06V 10/776 |
| 12,488,578 | B1 * | 12/2025 | Nath | G06V 10/82 |
| 2014/0334684 | A1 * | 11/2014 | Strimling | G06V 20/52<br>382/104 |
| 2015/0248595 | A1 * | 9/2015 | Khan | G08G 1/0175<br>382/105 |
| 2020/0293794 | A1 * | 9/2020 | Popov | G06F 18/2411 |
| 2023/0142507 | A1 * | 5/2023 | Yao | G06Q 40/08<br>382/103 |
| 2023/0153383 | A1 * | 5/2023 | Kobayashi | G06V 10/774<br>382/157 |
| 2025/0131729 | A1 * | 4/2025 | Schiffer | G06V 20/54 |

* cited by examiner

300

| Task | Classes | Train images | Test images |
|---|---|---|---|
| Car detection | 1 | 16 524 | 1537 |
| Car attributes detection | 2 | 14 581 | 1570 |
| Numbers recognition | 72 | 843 100 | 40 114 |
| Manufacturers recognition | 4 | 222 908 | 1182 |

302 304 306 308

FIG. 3

400

| Model | mAP / Accuracy |
|---|---|
| Car detection | 95.2 % |
| Car attributes detection | 91.3 % |
| Numbers recognition | 98.6 % |
| Manufacturers recognition | 99.7 % |

402

404

FIG. 4

500

| Class | Accuracy |
|---|---|
| Front | 97.3 % |
| Front-left | 97.6 % |
| Front-right | 99.4 % |
| Left | 98.0 % |
| Rear | 98.0 % |
| Rear-left | 99.2 % |
| Rear-right | 99.8 % |
| Rear | 97.3 % |

502 504

FIG. 5

SYSTEM AND METHOD FOR INTELLIGENCE-BASED RACING PHOTO ANALYSIS

TECHNICAL FIELD

The present disclosure generally relates to applications of computer vision models to analysis of images, specifically the analysis of photographic images.

BACKGROUND

Racing teams have traditionally relied on manual and time-consuming methods to analyze racing photos. Teams had to manually identify cars, their numbers, and brands by examining each photo individually. This process is tedious, prone to errors, and often delays the extraction of valuable insights. Due to the manual nature of the process, teams have been limited in the amount of data they can analyze. This hinders the ability to make informed decisions and gain a comprehensive understanding of race dynamics. The manual analysis of racing photos often leads to subjective evaluations and interpretations. This can result in inconsistencies and biases in the analysis, affecting the accuracy and reliability of the insights derived. The lack of an automated system has required teams to allocate significant resources and time to the analysis of racing photos. This diverted resources away from other critical areas, such as strategy development and driver performance optimization.

There is a need for improved systems and methods for quickly processing vast amounts of data that can give objective and consistent insights to support decision-making.

SUMMARY

A computer-implemented method is disclosed for detecting attributes of racing vehicles in a racing environment. The method comprises the steps of collecting training images of a plurality of racing vehicles marked with visible numbers, training a first machine-learning model with the training images to identify racing vehicle, training a second machine-learning model to recognize numbers on racing vehicles, and detecting, by the first machine-learning model, a racing vehicle marked with a visible number in a test image. The method proceeds by cropping the test image to focus on the visible number and processing the cropped test image by the second machine-learning model comprising a heuristic algorithm to find image patches with separate digits. The second machine-learning model processes the image patches to predict the digits and combines the predicted digits to produce a car-number prediction for the racing vehicle.

Variations of the method include further steps and configurations for detection of racing teams. For example, when the second machine-learning model results in accurate number detection, an image embedding is extracted and used as a reference embedding. When the number of reference embeddings reaches a predetermined threshold, a centroid embedding is calculated by averaging the reference embeddings. When the distance from an image embedding to a class centroid is below a predetermined threshold, the class is assigned to the image. The method may further comprise clustering images based on color scheme. The second machine-learning model can then assign corresponding team names to the clusters. In some embodiments, the training images are labeled manually. In alternative embodiments, the training images are labeled semi-automatically.

A system for identifying attributes of racing vehicles using a similar methodology is also disclosed. The system generally comprises a processor coupled to a storage medium and instructions that, when executed by the processor, implement a plurality of machine-learning modules. The modules comprise a first machine-learning model trained to identify a racing vehicle in images and a second machine-learning model trained to recognize numbers on racing vehicles. The second machine-learning model is configured for analyzing cropped images with car numbers and further comprises a heuristic algorithm to find image patches with separate digits. The second machine-learning model is configured to process the image patches to predict the digits. The second machine-learning model is further configured for combining the predicted digits to produce a car-number prediction for the racing vehicle.

In alternative embodiments, the second machine-learning model is configured for extracting an image embedding for use as a reference embedding when number detection is accurate. The second machine-learning model can also be configured to calculate a centroid embedding when the number of reference embeddings reaches a predetermined threshold, by averaging the reference embeddings and to assign a class to an image when the distance from the image embedding to a class centroid is below a predetermined threshold. The second-machine learning model can be configured for clustering images based on color scheme and for assigning corresponding team names to the clustered images. In an embodiment, the first and second machine learning models are trained on datasets comprising labeled images of racing vehicles that have been labeled manually in whole or in part.

An alternative method is also disclosed for detecting identifying attributes of racing vehicles. The method includes the steps of collecting training images of a plurality of racing vehicles, training a first machine-learning model with the plurality of training images to identify a racing vehicle, and training a second machine-learning model to recognize racing vehicle orientations divided into classes. The method further includes detecting, by the first machine-learning model, a racing vehicle marked with a visible number in a test image and cropping the test image to focus on the racing vehicle. The cropped test image is processed with the second machine-learning model and, with the second machine-learning model, an orientation prediction is generated comprising one of the orientation classes.

In variations of the method, eight classes are used: front, front-left, front-right, rear, rear-left, rear-right, left, and right. In an alternative embodiment, a stochastic descent optimizer is used to train the second machine-learning model. In a further embodiment, the method includes the step of applying one or more class balancing techniques to the plurality of test images.

BRIEF DESCRIPTION OF THE DRAWINGS

Exemplary embodiments are disclosed in the following figures.

FIG. 3 is a table showing an exemplary dataset of images from NASCAR racing environments, according to an embodiment.

FIG. 4 is a table showing exemplary detection-accuracy results for various models in terms of standard mean average precision (mAP), according to an embodiment.

FIG. 5 is a table of exemplary orientation-detection results obtained in an embodiment, according to an embodiment.

Figure 1A:
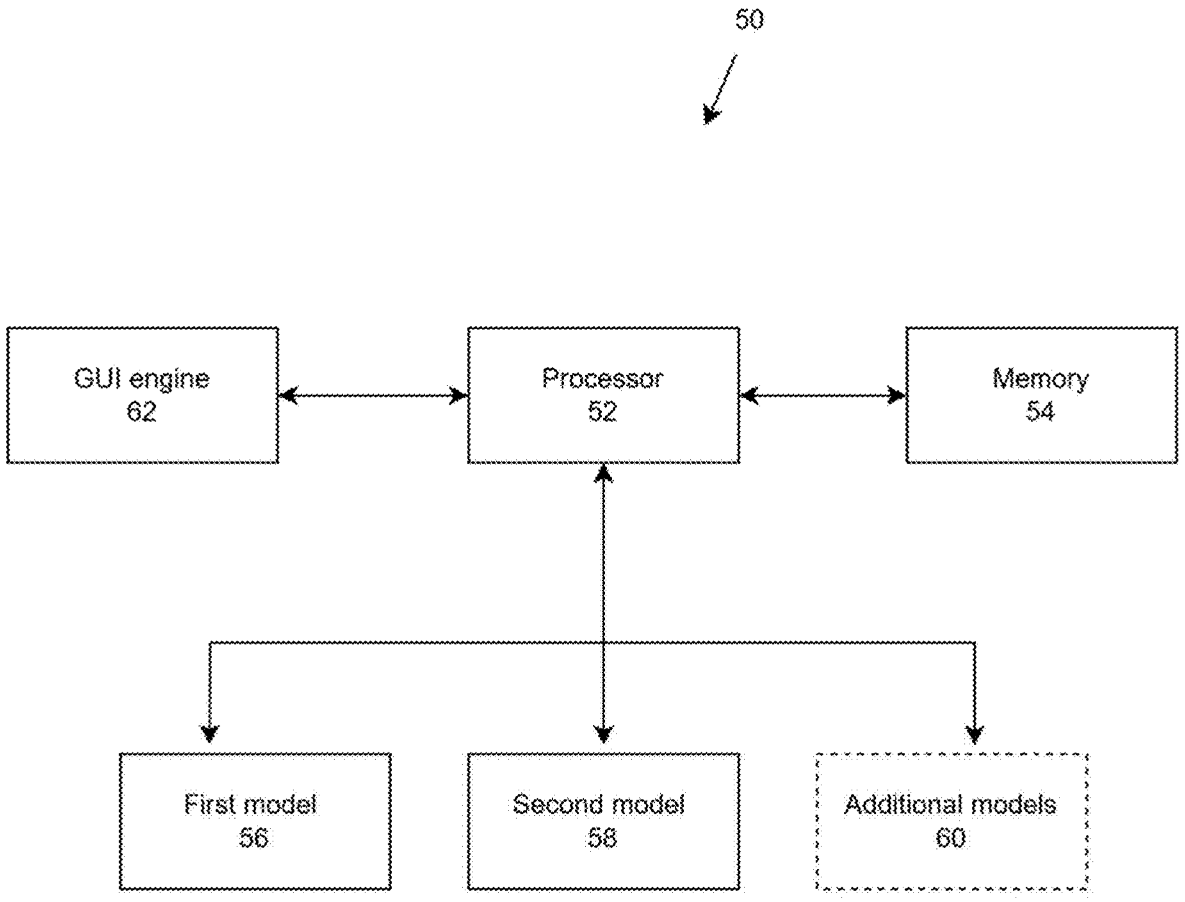
FIG. 1A is a block diagram of a system for analysis of racing images, according to an embodiment.

The embodiments described are exemplary ways to use the invention to solve technical problems in the field of the invention. The solutions and techniques disclosed may also be used to solve other problems in the field or to solve similar problems in other fields. Substitutions, modifications, and equivalents known to those of skill in the art may be used to implement these solutions and techniques, consistent with scope of the invention described in the claims.

DETAILED DESCRIPTION

A system for analyzing images in a racing environment comprises at least one processor and memory operably coupled to the at least one processor, and instructions that, when executed, cause the at least one processor to implement an application that uses deep learning and computer vision models. Automatic analysis of photographic images allows, for example, for the identification of important elements in these images. For example, the application can detect racing vehicles, vehicle numbers, vehicle details, and the orientation of these vehicles. These vehicles, typically cars, have specific attributes associated with a racing environment that can be detected with an application that comprises customized modules adapted to specific detection tasks. Corresponding computer-implemented methods can likewise identify attributes of racing vehicles.

Images of racing vehicles under race conditions present unique challenges for image recognition techniques using machine-learning models. For example, not all car numbers are available in a training set comprising images of racing cars. The fonts and colors of these car numbers may also differ from race to race. As described in detail below, special datasets with appropriate images and labeling consistent with a racing environment are therefore constructed and used for model training. These customized datasets comprise vehicle images under race conditions. The models trained with these datasets can classify vehicle images according to racing image categories and ensure that these image categories are detected quickly and accurately.

Generally speaking, the methodology comprises collecting and refining a dataset for model training through a continuous process that involves gathering pertinent data, labeling it, and using the labeled data to train and improve the deep learning and vision models. The datasets used for model training are prepared in a series of operations. In data collection operations, race photos from different series, for example, NASCAR or Formula 1, are used to capture a wide range of scenarios and conditions. Photos are chosen based on the quality of the images. For example, images obtained by professional photographers can be used to ensure that the dataset is consistent and high-quality. A data labeling operation follows, comprising labeling the collected photos with relevant information, such as the presence of cars, car numbers, manufacturer brands, orientations, and specific car details. Labeling can be done manually by dedicated annotators. Alternatively, semi-automatic labeling techniques can be used to expedite the process and ensure accuracy. A mix of manual and semi-automatic labeling techniques can also be used in combination.

Datasets are expanded and refined by incorporating new race events and user feedback into the dataset to account for changing conditions, new car designs, and evolving team strategies. A feedback loop is leveraged to collect images that require additional labeling or corrections, further enhancing the dataset's accuracy and comprehensiveness. Model training and improvement is accomplished by using deep learning models, such as EfficientDet, EfficientNet, and Keypoint R-CNN, for various tasks, including car detection, attribute recognition, orientation estimation, and detail measurement. Models are trained on the collected and labeled dataset to optimize their performance and accuracy. The models are regularly updated with new data and feedback to ensure continuous improvement and adaptation to evolving scenarios.

The methodology can be implemented by a general-purpose application with dedicated modules for specific racing-related tasks. Exemplary modules will be described in detail in the next section. In a typical embodiment, the application is configured with a graphical user interface (GUI) to present the results of image analysis to a user.

Referring to FIG. 1A, a system 50 for identifying attributes of racing vehicles is depicted, according to an embodiment. System 50 generally comprises at least one processor 52, a memory 54 operably coupled to at least one processor 52, a first machine-learning model 56, a second machine-learning model 58, optionally additional models 60, and a graphical user interface (GUI) engine 62.

First machine-learning model 56 can comprise a machine learning model trained to identify a racing vehicle in images. Second machine-learning model 58 can comprise a machine learning model trained to recognize numbers on racing vehicles. In an embodiment, second machine-learning model 58 is further trained to analyze cropped images with car numbers. In an embodiment, second machine-learning model 58 comprises a heuristic algorithm configured to find image patches with separate digits. In an embodiment, second machine-learning model 58 is further configured to process the image patches to predict the digits. In an embodiment, second machine-learning model 58 is further configured to combine the predicted digits to produce a car-number prediction for the racing vehicle. Optional additional models 60 can comprise one or more additional machine learning models trained for tasks described herein, including detecting racing teams or measurement of car details.

Figure 1B:
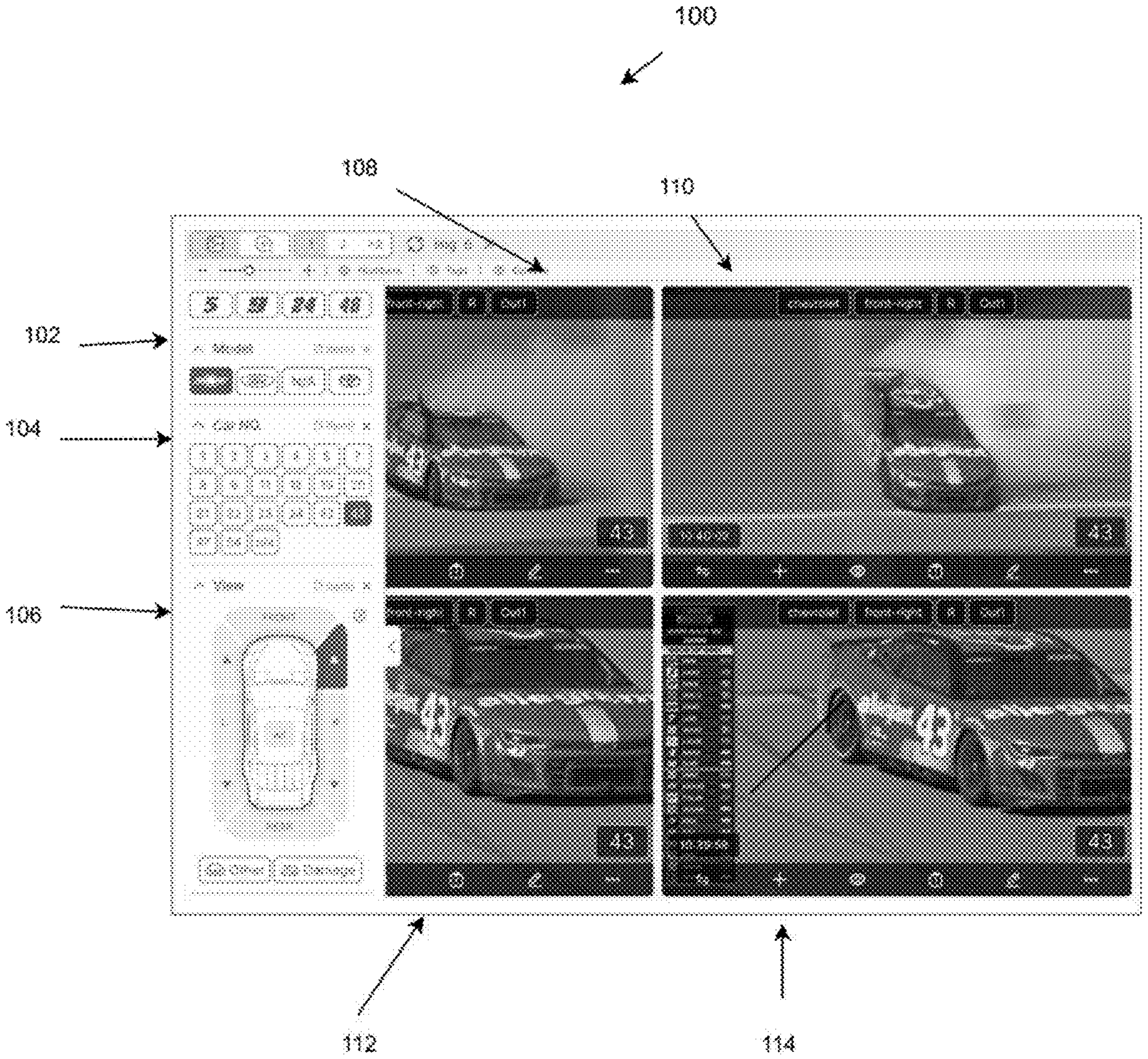
FIG. 1B is an exemplary graphical user interface (GUI) of an application for analysis of racing images, according to an embodiment.
Figure 2:
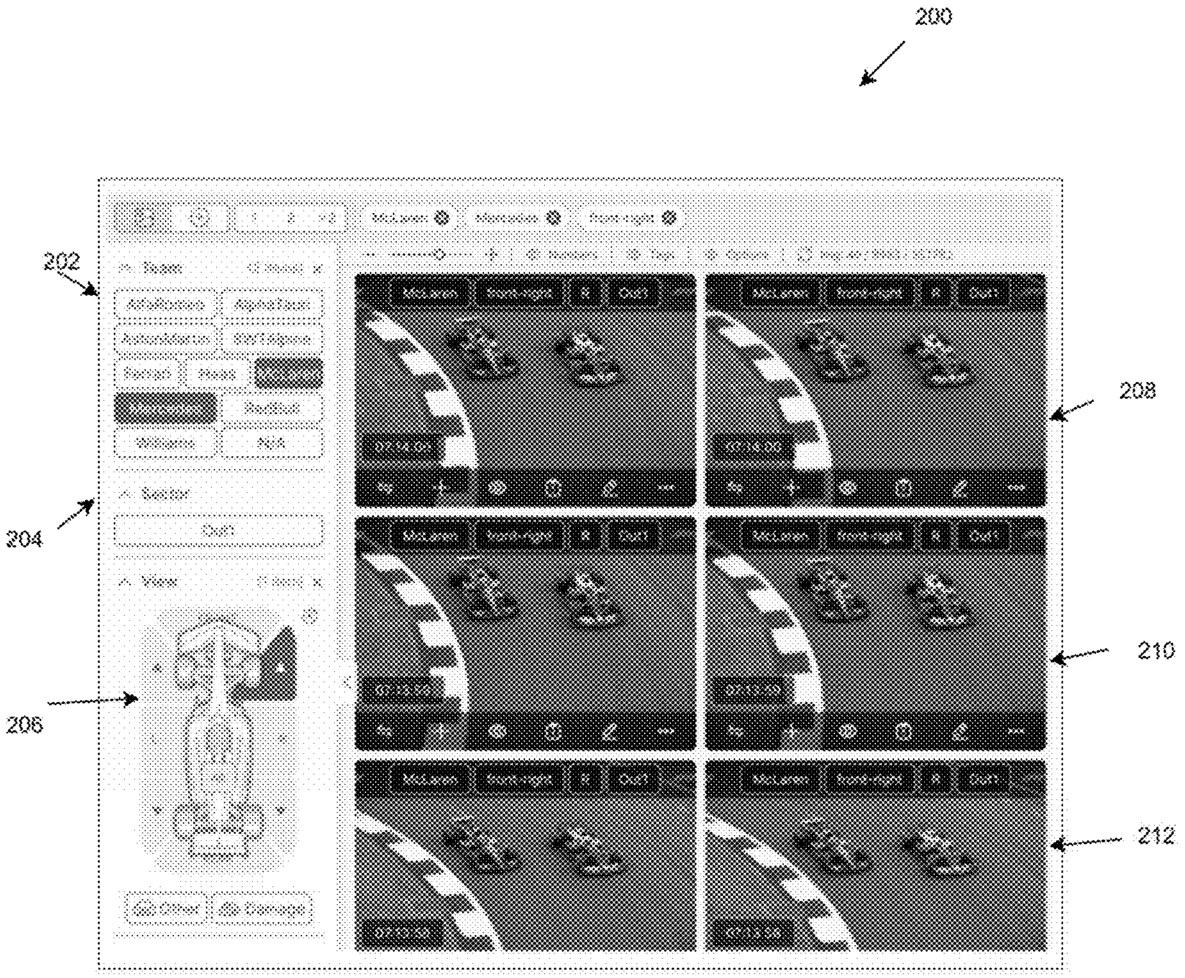
FIG. 2 is an exemplary alternative GUI for an application for analysis of racing images, according to an embodiment.

GUI engine 62 is configured to present an interface regarding the analysis conducted by system 50. An exemplary GUI 100 of an application interface presented by GUI engine 62 is shown in FIG. 1B. The interface shows the detection results of car model 102, detection results of car number 104, and detection results of orientation 106 for images 108, 110, 112, and 114. FIG. 1 shows an embodiment of the application configured for use with NASCAR images. An alternative exemplary GUI 200 is shown in FIG. 2. The interface shows racing-team detection results 202, sector information 204, and detected orientation 206 for racing image pairs 208, 210, and 212. FIG. 2 shows an embodiment of the application configured for use with Formula 1 images. In FIG. 2, two cars are detected in the images. Thus, two racing teams are indicated in team detection results 202.

In an embodiment, the application comprises a module for detection of specific features of race car components. Components in this context refer to attributes that are particularly significant for racing cars, such as the car's number or the car's manufacturer. The attributes of a racing car include its numbering (or distinctive markings) and manufacturer details. A cropped image of a detected car serves as a starting point for image analysis and classification. A detected-car image comprises attributes such as the car's number and the manufacturer's branding. Detected car numbers are used to identify cars in a race. Manufacturer brand detection is useful because it helps reduce classification errors. Racing teams generally use cars from different manufacturers so detected manufacturer brands can be used to more accurately identify cars.

Detection of car number and manufacturer brand comprises the use of a deep learning based object detector models such as EfficientDet. Multiple models are used, trained on different data sets. For example, one model is trained specifically for car detection. A second model is trained for detecting racing car attributes such as car numbers or manufacturer's brands. The model, such as EfficientDet, uses a bi-directional feature network (BiFPN) and special scaling rules. Each network component, such as backbone, feature, and box or class prediction network, has a single compound scaling factor that controls all scaling dimensions using heuristic-based rules. Model inferences must be made quickly so that photos can be processed as close to real-time as possible. EfficientNet is anchor based and trained using a k-means clustering algorithm on a dataset to find aspect ratios of anchor boxes. In an embodiment, 3-channel images are resized in training to 512×512. AdamW optimizer with learning rate 0.001 and cosine annealing learning rate schedule can be utilized. AdamW optimization is a stochastic gradient descent method based on adaptive estimation of first-order and second-order moments, with an added method to decay weights. AdamW modifies the typical implementation of weight decay in Adam by decoupling weight decay from the gradient update. In Adam, L2 regularization is usually implemented with the modification where wt is the rate of the weight decay at time t:

$$g_t = \nabla f(\theta_t) + w_t\theta_t$$

while AdamW adjusts the term of weight decay appearing in the gradient update:

$$\theta_{t+1,i} = \theta_{t,i} - \eta\left(\frac{1}{\sqrt{\hat{v}+\epsilon}}\cdot\hat{m}_t + w_{t,i}\theta_{t,i}\right), \forall\, t$$

AdamW yields models with improved generalization capabilities and is thus able to compete with Stochastic Gradient Descent (SGD), while training much faster.

In an embodiment, a dedicated model is used for the detection of car numbers. The model takes as input a cropped number from the attributes detection model. A car number is predicted from the cropped number. Car numbers present a technical problem for model training because not all car numbers are available in the training dataset. Fonts and colors also vary from one race to another. A heuristic algorithm is used to find image patches with separate digits. Each patch is then processed with EfficientNet to predict the digit. The digit-recognition model is trained using a cross-entropy loss function. Predicted digits are combined to obtain a final car number prediction. In an embodiment, a dedicated model is used for brand recognition. For example, a lightweight EfficientNet backbone with a classification head for 4 classes. An example of brand recognition by such a model appears in FIG. 1B where cars by a certain manufacturer are divided into the classes Chevrolet, Ford, Toyota, or no brand (N/A).

In an embodiment, a dataset comprising NASCAR racing photo images is used to build datasets for dedicated tasks. Exemplary datasets 300 are shown in FIG. 3. Tasks 302 comprise car detection, attributes detection, numbers recognition, and manufacturers recognition. The number of classes 304 for each task are 1 for car detection, 2 for car attributes detection, 72 for numbers recognition, and 4 for manufacturers recognition. For example, car detection can use one class, images with a car. Manufacturer recognition in the context of FIG. 1 uses four classes, one for each of three manufacturers and a catch all for no recognized manufacturer. Training images are used to train machine-learning models. The test images are set aside for testing the accuracy of the trained model. In an embodiment, the number of training images 306 for each category are 16,524 for car detection, 14,581 for car attributes detection, 843,100 for numbers recognition, and 222,908 for manufacturer recognition. The number of test images is 1537 for car detection, 1570 for car attributes detection, 40,114 for numbers recognition, and 1182 for manufacturer recognition.

Datasets can be updated with new racing images and through user feedback. For example, images can be added by way of the application interface provided by GUI engine 62. The car numbers recognition dataset can be enhanced by using synthetic data generation. In an embodiment, Big Generative Adversarial Network (BigGAN) is trained to generate dataset images. For example, 0.2% of the dataset images can be generated with BigGAN. BigGAN is an advanced version of the standard GAN architecture designed to produce high-quality and high-resolution images. It is distinguished by its large scale, both in terms of the size of the model and the amount of training data used. BigGAN employs a deep neural network with a significant number of layers and parameters, enabling it to generate more detailed and complex images than traditional GANs. A key feature of BigGAN is its ability to maintain stability during training, despite its size, which is achieved through techniques such as orthogonal regularization and the use of large mini-batch sizes.

In an embodiment, the models are tested offline to evaluate their results. For example, in detection tasks, a standard mean average precision (mAP) can be used. For recognition tasks, an accuracy metric can be employed. Exemplary results 400 are shown in FIG. 4. The models 402 comprise car detection, car attributes detection, number recognition, and manufacturers recognition. In an embodiment, each of models 402 is trained separately for its respective task. By way of example, a standard mean accuracy precision (mAP/Accuracy) 404 is shown for each model. The accuracy is 95.2% for the car detection model, 91.3% for the car attributes detection model, 98.6% for the numbers recognition model, and 99.7% for the manufacturers recognition model.

In an embodiment, the application comprises a module for detection of race car orientation. This module includes a model for analyzing photo streams from different cameras around a race track. This model allows different cars to be clustered so that the time to match cars is reduced.

For car-orientation prediction, a multi-class classification model is used. The model predicts an array of probabilities that can be used to define a car's orientation. For example, 8 classes can be used. In this embodiment, the classes include front, front-left, front-right, rear, rear-left, rear-right, left, and right. The model is based on the EfficientNet model with certain modifications. As its starting point, the car-orientation model uses the results of the car-detection model described above in connection with attribute detection. For example, the model takes a cropped 3-channel image of a car with a shape of 100×200 as input and returns an array with probabilities for each orientation. When the model is trained, an AdamW optimizer is used, along with a scheduler that reduces the learning rate when a metric stops improving. In an embodiment, the initial learning rate is set to 0.01, with a reduction factor of 0.1.

Class balancing techniques are applied to handle imbalanced data. In an embodiment, various techniques are used to address class imbalance, which occurs when certain classes are overrepresented compared to others. Resampling methods include both oversampling the minority class, where instances are replicated or synthetically created using techniques like Synthetic Minority Over-sampling Techniques (SMOTE) and undersampling the majority class by reducing its instances. Ensemble methods, such as Balanced Random Forest and adjusted boosting algorithms like AdaBoost, create multiple balanced datasets or emphasize minority class instances during training. Cost-sensitive learning assigns different weights to classes, focusing more on the minority class, while artificial data generation uses approaches like Generative Adversarial Networks (GANs) to generate new instances of underrepresented classes. GANs are a class of artificial intelligence algorithms used in unsupervised machine learning, implemented by a system of two neural networks contesting with each other in a game-theoretic scenario. Threshold moving adjusts the decision boundary in probabilistic models to be more inclusive of the minority class. Data augmentation can also be used to modify versions of minority class instances to enhance their representation in the dataset.

A dataset is collected to train, evaluate, and test the car-orientation model. For example, a dataset for configuring the application for predicting the orientation of vehicles in NASCAR races comprises a large number of NASCAR photos. In an embodiment, over 100,000 images are used. The images are taken from multiple events, for example, more than 100 events. Objects in the images include cars with different paint schemes under various conditions, including nighttime, daytime, and rainy, clear, or sunny weather. These images are labeled either manually or automatically, or semi-automatically, as with the other images described above. In an exemplary embodiment, the dataset is divided so that 70% of the images are used for training, 10% for validation, and 20% for testing.

Offline testing can be used to evaluate the model's ability to detect car orientation. The results of an exemplary test in a NASCAR setting are shown in FIG. 5. Results 500 are sorted by class 502 and accuracy 504. The classes 502 comprise a breakdown of 360 degrees into 8 categories: front, front-left, front-right, left, rear, rear-left, rear-right, and rear. The accuracy results 504 for each of the 8 classes 502 are 97.3%, 97.6%, 99.4%, 98.0%, 98%, 99.2%, 99.8%, and 97.3%, respectively.

In an embodiment, the application comprises a module for detecting the racing teams associated with car images. Racing teams have distinctive color schemes that are incorporated into the cars that represent these teams. Categorization of car images is implemented based on team affiliation using a customized machine-learning approach.

A Metric Learning implementation is used for racing team detection. The main encoder model takes 3-channel images as inputs and outputs a 1-D vector, or embedding, that corresponds to the color scheme of the car in the image. The embeddings are trained to be closer to each other for images of the same class and farther apart for different classes. In this context, a class represents a racing team. The closeness of the embeddings is determined using a cosine distance metric. In the training phase, a triplet loss is used to minimize the distance between embeddings of different class images. A fully connected layer with cross-entropy loss is also used to improve the results.

In the interference phase, clusters are created using the embeddings. At this point, there is no information about the team names that correspond to the clusters. The car-number recognitional model described above is used as a starting point. During a race, images are processed in sequence. If the car-number recognition model results in high accuracy in number detection, the image embedding is extracted and used as a reference embedding. Once the number of reference images for a given class reaches a certain threshold, a centroid embedding is calculated by averaging the reference embeddings. Now if the distance from an image embedding to a class centroid is below a threshold, the class is assigned to the image. This approach allows for clustering of images. For example, all images with cars can be grouped and a centroid calculated for the "car" image class. The car-number recognition model assigns corresponding team names to the clusters during the inference phase.

The dataset used for the team-recognition model comprises photographs taken during an event. All cars are detected in the frame of a photograph and a corresponding crop is made and saved. The crops are then labeled semi-automatically with numbers using the car-number recognition model and internal labeling validation tools. Through several iterations of labeling and validation, a high-quality dataset is obtained. This dataset is used for further analysis and model training.

Exemplary offline testing for this model comprises means cluster deviation (MCID). The distance from all embedding to the centroid is calculated for each cluster. The metric shows the mean of these averages, where the lower value is better than a higher value. Mean centroid deviation (MCeD) can also be used. Here the average distance among all the centroids is calculated and the higher value is better. Mean intra-outra distances delta (MIODD) is another metric that may optionally be used. This metric does not rely on centroids. Distances for each class between embeddings of a given class are calculated and averaged. This reflects the "intra" component of the metric. The distances for each pair of classes between different classes are also calculated and averaged. This is the "outra" component. The delta between the intra and outra distances shows the ability of the model to separate and categorize. In an exemplary embodiment, offline testing on a dataset of 14,867 images produced the results: MCID=0.167, MCeD=1.813, MIODD=0.572.

In an embodiment, the application comprises a module for measurement of car details. A direct correlation between image distances is established. Image distance is measured in pixels and real-world distances are measured in millimeters or inches. The correlation is achieved by detecting specific persistent parts of the car. In an embodiment, a standardized part size is used for reference. For example, a standardized wheel disk size is used for NASCAR racing cars. The standardized part size allows for consistent measurements across multiple images that include the standardized part. For example, the standard wheel disk size can be used to help identify wheel disks in images with other car parts Multiple models are used for image analysis. For example, a dedicated model is configured for detecting wheel bounding boxes and another for car orientation. In an embodiment, the car-orientation model described above is used for detection of car orientation. The models operate on all frames and do not require pixel-wise accuracy. The wheel keypoints model is specifically designed to work on cars from a side position such as the pitstop line. The car positioning allows for the wheels to be seen in profile, which minimizes the distortion due to perspective. Wheel crops obtained from the previous step are passed to the Keypoint R-CNN with ResNet-50 backbone.

Keypoint R-CNN is an advanced model that builds upon the Mask R-CNN framework, itself an extension of Faster R-CNN for object detection and instance segmentation. In Keypoint R-CNN, the core architecture comprises a deep convolutional Backbone Network for feature extraction and a Region Proposal Network (RPN) for generating candidate object bounding boxes. The unique aspect of Keypoint R-CNN lies in its ROI Head, which, in addition to the class labels, bounding box offsets, and object masks produced by Mask R-CNN, includes a keypoint detection head. This keypoint head is responsible for predicting keypoints within each Region of Interest (ROI), outputting a heatmap for each keypoint type. In practice, using tools like PyTorch and torchvision, a pre-trained Keypoint R-CNN model can be used to process images, where the model outputs bounding boxes, keypoints, and keypoint scores for each detected object. In an embodiment, a deep convolutional neural network, such as ResNet-50 with 50 layers, is used as the backbone architecture in Keypoint R-CNN for feature extraction. In this embodiment, ResNet-50 processes the input image to generate a rich feature map. This feature map is then used by the subsequent layers of Keypoint R-CNN, particularly the Region Proposal Network (RPN) and the ROI Head. The RPN uses these features to propose candidate regions (bounding boxes) that potentially contain objects. Then for each proposed region the ROI Head's Box Head refines the bounding box and classifies the object, while the Keypoint Head predicts the location of various keypoints within the box. ResNet-50 provides a deep understanding of the visual content, enabling Keypoint R-CNN to effectively detect objects and their keypoints.

In an embodiment, a head presents coordinates of 6 keypoints: 4 edges of the wheel disk, the disk center, and the point where the wheel touches the ground. In this embodiment, the 4 edges of the wheel disk comprise top, right, bottom, and left. An exemplary loss function is used, such as mean-squared error. The input of the model is a 3-channel 512×512 image. The radius of the wheel disk is calculated from the keypoint detections. Two lines are drawn, where one line connects the centers of the disks and another line connects the points where the wheels touch the ground. The size of the wheel disk radius is known in advance. Thus, distances such as line lengths can be automatically calculated based on this information.

The dataset for the module is collected similarly to the datasets for the other modules. The keypoints dataset includes car wheels crops with six keypoints coordinates. If the point of ground touch is not available on the wheel crop, the coordinate is used instead. For example, the coordinate can have the form "image_width/2,0. The training set in an exemplary embodiment comprises about 2900 images.

An exemplary evaluation of the dataset for this module comprises Common Objects in Context (COCO) metrics. The COCO dataset is a comprehensive resource in computer vision, known for its large scale, diversity, and detailed annotation, making it a prime benchmark for assessing modern vision algorithms. When applied to Keypoint R-CNN, COCO's standardized metrics, including Average Precision (AP) and Average Recall (AR) across various Intersection over Union (IoU) thresholds and object scales, are crucial. Specifically, the dataset's metrics for keypoint detection, like the Object Keypoint Similarity (OKS)-based AP, play a significant role in evaluating and benchmarking the performance of Keypoint R-CNN models. This benchmarking is essential not only for comparing state-of-the-art models but also for identifying and addressing weaknesses in Keypoint R-CNN models. In an exemplary embodiment, the main metrics for a test dataset of 288 images produced an AP values of 0.977 and an AR value of 0.986.

In an exemplary embodiment, the application is deployed on a virtual machine using a cloud service provider such as Microsoft Azure. Bare metal deployments may also be used. Generally speaking, hardware and software compatible with machine-learning applications is preferable. An example of such a deployment comprises a virtual machine configured with four virtual CPUs, 16 GB RAM, and one virtual GPU, such as the Nvidia Tesla K80 with 12 GB memory. Data storage can be handled by a database such as MongoDB. In an embodiment, the deep learning models described above are trained and deployed using the PyTorch library.

Collection of images for the datasets may mostly or entirely comprise images that focus on cars in racing events, such that images without cars make up an extremely small percentage of the images. User feedback images can also be used. User feedback images are used to enhance model accuracy and generalizability. The application optionally accepts user feedback in the form of labeled images. This operations integrates human expertise into the dataset, providing annotations and corrections. For instance, users might label specific car models, features, or attributes that the model initially misinterpreted or overlooked. This intervention helps align the model's outputs more closely with real-world variations and intricacies in image interpretation. Images labeled by users can be reintegrated into the test datasets. This integration provides a more comprehensive test bed for the model, encompassing a broader range of real-world scenarios. In exemplary embodiments, the average percentage of images with no car returned by the application is less than 1% and the average number of feedback images is also 1%. These percentages are consistent with positive user experience and also provide useful updates for the test datasets.

The invention claimed is:

1. A computer-implemented method for identifying attributes of racing vehicles, the method comprising:

collecting training images of a plurality of racing vehicles, wherein the plurality of vehicles are marked with visible numbers;

training a first machine-learning model with the training images to identify racing vehicles;

training a second machine-learning model to recognize numbers on racing vehicles;

detecting, by the first machine-learning model, a racing vehicle marked with a visible number in a test image;

cropping the test image to focus on the visible number;

processing the cropped test image by the second machine-learning model;

wherein the second machine-learning model comprises a heuristic algorithm to find image patches with separate digits;

wherein the second machine-learning model processes the image patches to predict the digits;

wherein the second machine-learning model implements an image embedding that is extracted and used as a reference embedding, and wherein when the number of reference embeddings reaches a predetermined threshold, a centroid embedding is calculated by averaging the reference embeddings; and combining the predicted digits to produce a car-number prediction for the racing vehicle.

2. The method of claim 1, wherein when a distance from an image embedding to a class centroid is below a predetermined threshold, the class is assigned to the image.

3. The method of claim 2, further comprising clustering images based on color scheme.

4. The method of claim 3, wherein the second machine-learning model assigns corresponding team names to the clusters.

5. The method of claim 1, wherein the training images are labeled manually.

6. The method of claim 1, wherein the training images are labeled semi- automatically.

7. A system for identifying attributes of racing vehicles, the system comprising;

a processor coupled to a storage medium; and instructions that, when executed by the processor, implement a plurality of machine- learning modules, the modules comprising:

a first machine-learning model trained to identify a racing vehicle in images;

a second machine-learning model trained to recognize numbers on racing vehicles;

wherein the second machine-learning model is configured for analyzing cropped images with car numbers;

wherein the second machine-learning model comprises a heuristic algorithm to find image patches with separate digits;

wherein the second machine-learning model is configured to process the image patches to predict the digits;

wherein the second machine-learning model is further configured for combining the predicted digits to produce a car-number prediction for the racing vehicle;

wherein the second machine-learning model is configured to extract an image embedding for use as a reference embedding, and wherein the second machine-learning model is configured to calculate a centroid embedding when the number of reference embeddings reaches a predetermined threshold, by averaging the reference embeddings.

8. The system of claim 7, wherein the second machine-learning model is configured to assign a class to an image when a distance from the image embedding to a class centroid is below a predetermined threshold.

9. The system of claim 8, wherein the second-machine learning model is configured for clustering images based on color scheme.

10. The system of claim 9, wherein the second machine-learning model is configured for assigning corresponding team names to the clustered images.

11. The system of claim 7, wherein the first and second machine learning models are trained on datasets comprising labeled images of racing vehicles, and wherein a plurality of the labeled images have been labeled manually.

12. A computer-implemented method for identifying attributes of racing vehicles, the method comprising:

collecting training images of a plurality of racing vehicles;

training a first machine-learning model with the plurality of training images to identify a racing vehicle;

training a second machine-learning model to recognize racing vehicle orientations;

wherein the racing vehicle orientations are divided into classes detecting, by the first machine-learning model, a racing vehicle marked with a visible number in a test image;

cropping the test image to focus on the racing vehicle;

processing the cropped test image with the second machine-learning model; and generating, with the second machine-learning model, an orientation prediction comprising one of the orientation classes, wherein the second machine-learning model is configured to extract an image embedding for use as a reference embedding, and wherein the second machine-learning model is configured to calculate a centroid embedding when the number of reference embeddings reaches a predetermined threshold, by averaging the reference embeddings.

13. The method of claim 12, wherein the classes comprise front, front-left, front-right, rear, rear-left, rear-right, left, and right.

14. The method of claim 12, wherein a stochastic descent optimizer is used to train the second machine-learning model.

15. The method of claim 12, further comprising applying one or more class balancing techniques to the plurality of test images.

16. The method of claim 12, wherein the second machine-learning model implements an image embedding that is extracted and used as a reference embedding.

* * * * *